(12) United States Patent
Guzman

(10) Patent No.: US 9,393,962 B2
(45) Date of Patent: Jul. 19, 2016

(54) VEHICLE HAVING ITS OPERATING CONDITIONS REGULATED BY FUEL CONSUMPTION

(76) Inventor: Cristobal Guzman, Güglingen (DE)

(*) Notice: Subject to any disclaimer, the term of this patent is extended or adjusted under 35 U.S.C. 154(b) by 1073 days.

(21) Appl. No.: 11/911,998

(22) PCT Filed: Apr. 5, 2006

(86) PCT No.: PCT/DE2006/000601
§ 371 (c)(1),
(2), (4) Date: Dec. 26, 2007

(87) PCT Pub. No.: WO2006/111128
PCT Pub. Date: Oct. 26, 2006

(65) Prior Publication Data
US 2008/0195302 A1   Aug. 14, 2008

(30) Foreign Application Priority Data
Apr. 19, 2005   (DE) .......................... 10 2005 017 965

(51) Int. Cl.
*B60W 30/00* (2006.01)
*B60W 30/14* (2006.01)
*F02D 41/14* (2006.01)

(52) U.S. Cl.
CPC ............ *B60W 30/143* (2013.01); *F02D 41/14* (2013.01); *B60W 2550/141* (2013.01); *B60W 2550/402* (2013.01); *F02D 2200/0614* (2013.01); *F02D 2200/0625* (2013.01); *F02D 2200/701* (2013.01); *Y02T 10/52* (2013.01)

(58) Field of Classification Search
CPC combination set(s) only.
See application file for complete search history.

(56) References Cited

U.S. PATENT DOCUMENTS

| 4,262,642 A | * | 4/1981 | Sverdlin | F02D 1/14 123/378 |
| 4,353,272 A | * | 10/1982 | Schneider | B60W 10/06 477/110 |
| 4,515,040 A | * | 5/1985 | Takeuchi | B60W 10/06 477/43 |
| 4,550,701 A | * | 11/1985 | Suzuki | F02D 41/04 123/436 |
| 4,559,599 A | * | 12/1985 | Habu | B60R 16/0236 340/439 |
| 4,590,568 A | * | 5/1986 | Barske | B60K 31/18 701/123 |
| 4,704,683 A | * | 11/1987 | Osanai | B60W 10/06 474/12 |
| 4,716,872 A | * | 1/1988 | Pol | F02D 31/001 123/352 |
| 4,736,301 A | * | 4/1988 | Osanai | B60W 10/06 474/12 |
| 5,383,431 A | * | 1/1995 | Nishimura | F02D 11/105 123/399 |
| 5,595,551 A | * | 1/1997 | Hedstrom | B60W 10/06 477/109 |
| 5,638,677 A | * | 6/1997 | Hosono | E02F 9/2235 60/431 |

(Continued)

FOREIGN PATENT DOCUMENTS

DE   100 24 231 A1   11/2001
FR   2813050 A   2/2002

(Continued)

*Primary Examiner* — Jonathan L Sample
(74) *Attorney, Agent, or Firm* — Edwin D. Schindler

(57) ABSTRACT

An engine-powered vehicle includes a measuring instrument that registers the actual value for fuel consumption for the vehicle and a device for presetting a setpoint value for the fuel consumption. The actual value of the fuel consumption for the vehicle that is registered is used to control, and adjust, the output of the engine for controlling the vehicle's speed.

14 Claims, 1 Drawing Sheet

(56) References Cited

U.S. PATENT DOCUMENTS

Figure 1:
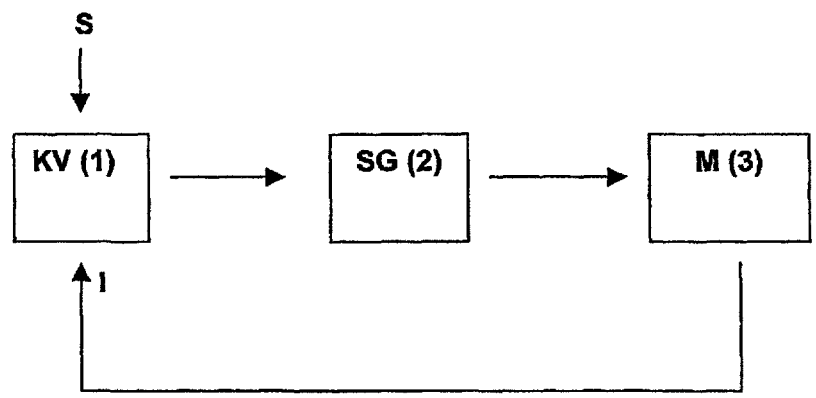

| | | | | |
|---|---|---|---|---|
| 5,722,911 A * | 3/1998 | Ibaraki | | B60K 6/48 180/65.25 |
| 5,789,882 A * | 8/1998 | Ibaraki | | B60K 6/48 180/65.25 |
| 5,832,896 A * | 11/1998 | Phipps | | F02D 31/002 123/352 |
| 5,842,534 A * | 12/1998 | Frank | | B60K 6/48 180/65.25 |
| 5,948,034 A * | 9/1999 | Tihanyi | | B60W 10/02 477/120 |
| 6,054,844 A * | 4/2000 | Frank | | B60K 6/46 180/65.21 |
| 6,086,511 A * | 7/2000 | Droge | | B60K 26/00 477/107 |
| 6,116,363 A * | 9/2000 | Frank | | B60K 6/48 180/65.25 |
| 6,188,943 B1 * | 2/2001 | Uchida | | B60W 10/02 192/3.54 |
| 6,453,731 B1 * | 9/2002 | Yaegashi | | B60K 35/00 73/114.52 |
| 6,631,705 B1 * | 10/2003 | Rivera | | F02M 17/04 123/452 |
| 6,985,804 B2 * | 1/2006 | Minami | | F16H 61/0213 340/439 |
| 7,353,804 B2 * | 4/2008 | Bucktron | | F02D 41/0027 123/352 |
| 7,454,285 B2 * | 11/2008 | Christie | | B60W 10/12 123/1 A |
| 7,483,814 B2 * | 1/2009 | Hoshi | | E02F 9/26 702/182 |
| 2002/0016662 A1 * | 2/2002 | Belschner et al. | | 701/70 |
| 2002/0062183 A1 * | 5/2002 | Yamaguchi | | B60K 6/46 701/22 |
| 2004/0060751 A1 * | 4/2004 | Frank | | B60K 6/48 180/65.21 |
| 2004/0093149 A1 * | 5/2004 | Hara | | B60H 1/00885 701/104 |
| 2004/0098984 A1 * | 5/2004 | Duell | | E02F 9/2235 60/431 |
| 2004/0099459 A1 * | 5/2004 | Nakasako | | B60K 6/48 180/248 |
| 2004/0251065 A1 * | 12/2004 | Komiyama | | B60K 6/365 180/65.23 |
| 2004/0254039 A1 * | 12/2004 | Yasui | | B60K 6/365 475/5 |
| 2005/0055157 A1 * | 3/2005 | Scholl | | 701/207 |
| 2005/0088139 A1 * | 4/2005 | Frank | | B60K 6/48 320/104 |
| 2005/0109551 A1 * | 5/2005 | Komiyama | | B60K 6/365 180/65.235 |
| 2005/0288146 A1 * | 12/2005 | Englisch | | B60K 6/485 477/2 |
| 2006/0047404 A1 * | 3/2006 | Blankenhorn | | F02D 41/021 701/103 |
| 2006/0052917 A1 * | 3/2006 | Schwarzhaupt | | B60T 7/12 701/31.4 |
| 2006/0287841 A1 * | 12/2006 | Hoshi | | E02F 9/26 702/182 |
| 2008/0195302 A1 * | 8/2008 | Guzman | | 701/123 |
| 2008/0208451 A1 * | 8/2008 | Minami | | G01C 21/3484 701/533 |

FOREIGN PATENT DOCUMENTS

| | | |
|---|---|---|
| FR | 2838683 A | 10/2003 |
| WO | WO 2005024209 A1 * | 3/2005 |

* cited by examiner

VEHICLE HAVING ITS OPERATING CONDITIONS REGULATED BY FUEL CONSUMPTION

BACKGROUND OF THE INVENTION

Description of the Prior Art

With modern vehicles (cars, heavy goods vehicles), it is known to register the instantaneous fuel consumption during running and to display it in an analogue or digital fashion. The level of fuel consumption does not only depend on the engine output of a vehicle, but also on the individual driving technique and the road situation. At high speeds, with continual braking and acceleration in city traffic, fuel consumption increases. These displays permit the driver to monitor fuel consumption and thereby adapt his driving technique to reduce fuel consumption. However, it is necessary to regularly keep an eye on the display so as to keep fuel consumption under control by operating the accelerator pedal or selecting a more favorable gear.

It is further known in the prior art to install an electronic regulator in a vehicle, which is used for controlling the vehicle speed. These speed regulators are known as "Tempomats." Here, a particular speed is preset as setpoint value and adjusted and maintained by the engine setting. With the given engine setting, the driver can cover the desired distance at a constant speed without needing to operate the accelerator pedal during driving. Where braking or acceleration is necessary, because of a particular traffic situation (e.g. congestion or city traffic), the preset engine setting can be deactivated by operating the brake or clutch pedal. The disadvantage of the use of the "Tempomat" consists in the fact that attention is not paid to the level of fuel consumption as a function of, e.g., the relief of the stretch of road.

SUMMARY OF THE INVENTION

The object of the invention is to make fuel consumption of vehicles more economical by taking particular measures for adjusting the engine output with the objective of reducing fuel consumption.

This object is achieved according to the invention in that the setpoint of the fuel consumption is preset and the measured value is used for engine control.

Here, a particular value of fuel consumption is preset as a setpoint value and adjusted and maintained by the engine setting. The maintenance of the setpoint value is performed in that the actual value of fuel consumption is measured and transferred to the engine control. The measured actual value is then compared with the setpoint value and the engine speed or output is changed by appropriate actuating commands. such that the consumption value is matched to the preset setpoint value. The motorized vehicle according to the invention, in which the fuel consumption is preset as a setpoint value, in contrast to fuel consumption displays of the prior art, leads to an automatic fuel saving. This allows the driver to concentrate more on the traffic without needing to pay attention to the fuel consumption.

DETAILED DESCRIPTION OF THE PREFERRED EMBODIMENTS

The method of operation of a fuel consumption regulator is similar to that of a speed control unit (e.g., "Tempomat.") The difference consists in the fact that the fuel consumption, instead of the speed, that must not be exceeded is input as a setpoint value. The constructional realization of the control loop according to the invention does not present any difficulties, since its construction permits extensive adoption and use of parts of the "Tempomat" and only the control signal is obtained by different means, namely via the fuel consumption. The fuel saving achieved in this manner not only contributes to reducing the fuel costs of the individual, but also to conserving the resources of our environment.

Furthermore, the two control systems—the fuel consumption regulator and the speed control unit ("Tempomat")—are connected together as a combination, such that both components—fuel consumption and speed adjustment of the engine—act on the same actuator of the engine. The speed adjusted via the "Tempomat" can be maintained as long as the preset maximum threshold of fuel consumption is not exceeded. That means that the fuel consumption signal in this control loop has top priority. The control, via the speed, thus only takes place if the setpoint value for fuel consumption is not exceeded. There is an advantage in that all data and support circuits are present and only have to be connected together to ensure economical running.

Furthermore, the acceleration via the preset setpoint value for fuel consumption is possible in order, e.g. to ameliorate dangerous traffic situations; it being possible to deactivate the engaged engine control by actuating the accelerator or brake pedal.

In a further embodiment, manual deactivation is provided to operate the vehicle conventionally, if necessary.

In an advantageous further development of the invention, it is proposed to provide a plurality of setpoint values for fuel consumption with different values.

In particular, as a result of this teaching, measures for controlling can be provided that, in the setting of the setpoint value for fuel consumption, take into account changing road situations (inner city, cross-country road and motorway). The fuel consumption in the inner city is known to be higher as a result of the continual braking or acceleration than on a free cross-country road when driving at constant speed. It is therefore advisable to make three different road situations (inner city, cross-country road and motorway) manually adjustable on the fuel consumption regulator.

Moreover, setting of the fuel consumption can be performed automatically via the navigation system. That permits the fuel consumption regulator to respond automatically and autonomously. In the case where, e.g., a car drives from the motorway into the city, the setpoint threshold for fuel consumption is automatically increased. The advantages obtained with the invention consist in the automatic adaptation of the fuel regulator to the road traffic situation.

Further details, features and advantages of the invention can be taken from the following descriptive part, in which two exemplary embodiments of the invention are explained with reference to the drawings,

BRIEF DESCRIPTION OF THE DRAWING FIGURES

Figure 2:
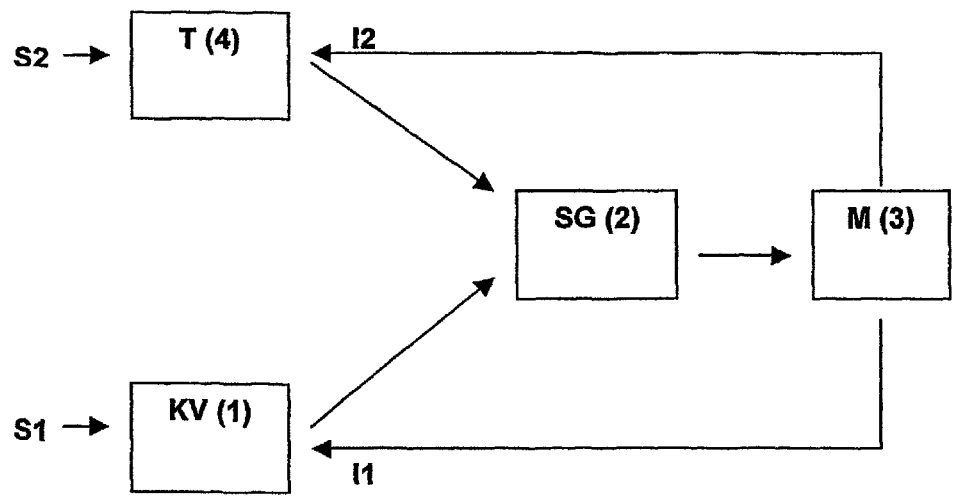

FIG. 1 shows the control loop proposed according to the invention as a block circuit diagram, FIG. 2 shows the control loop proposed according to the invention in interaction with a "Tempomat."

DETAILED DESCRIPTION OF THE DRAWING FIGURES

The control loop shown in the first drawing (FIG. 1) as a block circuit diagram is made up of three measuring elements. The first measuring element is the fuel consumption regulator (1). Here, the setpoint value for fuel consumption is preset and the measured actual value is supplied. The control parameter obtained thereby acts on the actuator (2) for adjusting the engine output (3). At the same time, the actual value for fuel consumption is measured with a particular sampling rate and is transferred from the engine (3) to the regulator (1). The fuel consumption regulator then compares the measured actual value with the setpoint value and matches the actual value to the preset setpoint value in that the engine speed or engine output is changed by the action (1) on actuator (2). The determined speed is subsequently preset on the engine (3) via the actuator (2). The engine (3) runs with the preset speed; the actual value of the fuel consumption being measured with a sampling rate and sent to the fuel consumption regulator (1). Here, the process is repeated by comparing and subsequently matching the actual value to the setpoint value.

In the second drawing (FIG. 2)—also shown as a block circuit diagram—the control loop described under FIG. 1 is complemented by a further measurement element. The measuring element (4) is the "Tempomat." In this control loop, two setpoint values—fuel consumption S1 and speed S2—are predetermined; S1 having priority over S2. The preset setpoint values are transferred via the actuator (2) to the engine (3) where they are implemented. At the same time, two actual values—petrol consumption I1 and speed I2—are measured with a sampling rate and sent to the corresponding regulator [I1 to (1) and I2 to (2)]. The actual values are compared to the setpoint values, as described in FIG. 1, and adapted to the setpoint values by adjusting the engine speed. As long as setpoint S1 is not exceeded, setpoint S2 remains unchanged. As soon as setpoint value S1 is exceeded, e.g. dependent on the road conditions (gradients, different strengths of headwind), setpoint S2 can be deactivated or set to a different value.

As a result, therefore, a fuel consumption regulator can be used in combination with a speed control unit; it being possible to efficiently reduce fuel consumption and to regulate the speed setting via the petrol consumption. Moreover, the mode of operation of the fuel consumption regulator takes into account changing road situations (inner city, cross-country road and motorway), which contributes to fuel saving. A targeted fuel saving leads to both economical and environmentally friendly driving.

REFERENCE SIGN LIST

KV Fuel consumption regulator
SG Actuator
M Engine
T Tempomat
S Setpoint value [S1—setpoint value 1, S2—setpoint value 2]
I Actual value [I1—actual value 1, I2—actual value 2]

The invention claimed is:

1. An engine-powered vehicle, comprising:
    an actuator for changing engine power;
    a measuring instrument for measuring an actual value for fuel consumption;
    a fuel consumption regulator for pre-setting a value for a desired rate of fuel consumption to be measured in real-time being pre-set as a setpoint value and with said fuel consumption regulator being utilized for automatically and autonomously controlling engine power and engine speed, wherein said fuel consumption regulator performs a comparison of the actual value for fuel consumption as measured by said measuring instrument with said setpoint value for the desired rate of fuel consumption to be measured in real-time and matches the actual value for fuel consumption to said setpoint value by automatically and autonomously changing the engine power and the engine speed via acting upon said actuator based upon the comparison of said setpoint value for the desired rate of fuel consumption measured in real-time and said actual value of said fuel consumption; and,
    means for deactivating said fuel consumption regulator via depressing a brake pedal or a clutch pedal of said engine-powered vehicle.

2. The engine-powered vehicle according to claim 1, wherein said means for deactivating said fuel consumption regulator is manually performed.

3. The engine-powered vehicle according to claim 1, wherein said set-point value for fuel consumption is manually adjustable.

4. The engine-powered vehicle according to claim 1, wherein a plurality of setpoint values for fuel consumption are set and are adjustable.

5. The engine-powered vehicle according to claim 4, wherein said plurality of setpoint values are adjustable for different types of road conditions.

6. The engine-powered vehicle according to claim 5, wherein adjustability of said plurality of setpoint values is automatically performed via a navigation system as a function of the different types of road conditions.

7. The engine-powered vehicle according to claim 1, wherein acceleration of said engine-powered vehicle occurs via said setpoint value for fuel consumption.

8. An engine-powered vehicle, comprising:
    an actuator for changing engine power;
    a measuring instrument for measuring an actual value for fuel consumption;
    a speed controller for setting a desired preset value for speed of said engine-powered vehicle;
    a fuel consumption regulator for pre-setting a value for a desired rate of fuel consumption to be measured in real-time and being pre-set as a setpoint value, and with said fuel consumption regulator and said speed controller being utilized in combination for automatically and autonomously controlling engine power and the engine speed of said engine-powered vehicle; and,
    means for deactivating said fuel consumption regulator and said speed controller via depressing a brake pedal or a clutch pedal of said engine-powered vehicle,
    wherein said fuel consumption regulator performs a comparison of the actual value for fuel consumption, as measured by said measuring instrument, with said setpoint value for the desired rate of fuel consumption to be measured in real-time;
    said speed controller performs a comparison of an actual value for speed of the engine-powered vehicle with said desired preset value for speed; and,
    said speed controller and said fuel consumption regulator automatically and autonomously change the engine power and the engine speed by acting in combination upon said actuator based upon said comparison of the actual value for fuel consumption with said setpoint value for the desired rate of fuel consumption to be measured in real-time and said comparison of the actual value for speed of the engine-powered vehicle with said desired preset value for speed.

9. The engine-powered vehicle according to claim 8, wherein said means for deactivating said fuel consumption regulator is manually performed.

10. The engine-powered vehicle according to claim 8, wherein said set-point value for fuel consumption is manually adjustable.

11. The engine-powered vehicle according to claim 8, wherein a plurality of setpoint values for fuel consumption are set and are adjustable.

12. The engine-powered vehicle according to claim 11, wherein said plurality of setpoint values are adjustable for different types of road conditions.

13. The engine-powered vehicle according to claim 12, wherein adjustability of said plurality of setpoint values is automatically performed via a navigation system as a function of the different types of road conditions.

14. The engine-powered vehicle according to claim 8, wherein acceleration of said engine-powered vehicle occurs via said setpoint value for fuel consumption.

\* \* \* \* \*